(12) United States Patent
Halsell

(10) Patent No.: US 7,308,248 B2
(45) Date of Patent: Dec. 11, 2007

(54) CONNECTION OF ONE OR MORE TOLL-FREE CALLS WITH ONE OR MORE MOBILE PHONES ASSOCIATED WITH ONE OR MORE TOLL-FREE NUMBERS

(75) Inventor: Victoria Marie Halsell, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 365 days.

(21) Appl. No.: 10/692,629

(22) Filed: Oct. 24, 2003

(65) Prior Publication Data

US 2005/0101289 A1   May 12, 2005

(51) Int. Cl.
*H04M 11/00* (2006.01)
*H04M 3/42* (2006.01)

(52) U.S. Cl. .................. 455/406; 455/414.1

(58) Field of Classification Search ........... 455/445, 455/405, 461, 406, 414.1, 417, 554.1; 379/220.01, 379/221.14, 127.05, 222, 114.24
See application file for complete search history.

(56) References Cited

U.S. PATENT DOCUMENTS

| | | | | |
|---|---|---|---|---|
| 5,319,699 A | * | 6/1994 | Kerihuel et al. | 455/461 |
| 5,550,909 A | * | 8/1996 | Chanda et al. | 379/221.14 |
| 5,557,664 A | * | 9/1996 | Burns et al. | 379/127.05 |
| 5,617,448 A | * | 4/1997 | Bolinger et al. | 379/114.24 |
| 5,946,623 A | * | 8/1999 | Spradlin | 455/445 |
| 6,023,504 A | * | 2/2000 | Connolly | 379/220.01 |
| 6,343,123 B1 | * | 1/2002 | Lehmacher et al. | 379/220.01 |
| 6,681,008 B2 | * | 1/2004 | Bolduc et al. | 379/222 |
| 6,968,205 B2 | * | 11/2005 | Burnham | 455/554.1 |
| 7,155,204 B1 | * | 12/2006 | Hefter et al. | 455/406 |
| 2002/0147001 A1 | * | 10/2002 | Newdelman et al. | 455/405 |

FOREIGN PATENT DOCUMENTS

| WO | WO 00/38403 | 6/2000 |
|---|---|---|
| WO | WO 03/039128 | 5/2003 |

* cited by examiner

*Primary Examiner*—Joseph Feild
*Assistant Examiner*—Kiet Doan

(57) ABSTRACT

One or more control components of an apparatus that connect with one or more mobile phones one or more toll-free calls placed by one or more users of one or more communication devices to one or more toll-free numbers associated with the one or more mobile phones.

19 Claims, 3 Drawing Sheets

CONNECTION OF ONE OR MORE TOLL-FREE CALLS WITH ONE OR MORE MOBILE PHONES ASSOCIATED WITH ONE OR MORE TOLL-FREE NUMBERS

TECHNICAL FIELD

The invention relates generally to telecommunications and more particularly to toll-free calls.

BACKGROUND

A user of a calling communication device dials a toll-free number to place a toll-free call to a user of a called communication device. For example, the toll-free number is associated with the called communication device. In one example, the called communication device comprises a landline phone. A control component of a public switched telephone network ("PSTN") connects the toll-free call to the called communication device to communicatively couple the user of the calling communication device with the user of the called communication device. The control component of the public switched telephone network in one example compiles a billing record based on the toll-free call. Rather than an owner of the calling communication device, an owner of the toll-free number (e.g., the owner of the called communication device) is responsible for a bill based on the billing record of the toll-free call.

In another example, the called communication device comprises a mobile phone. A control component of a mobile network connects a non-toll-free call to the mobile phone to communicatively couple the user of the calling communication device with the user of the mobile phone. The control component of the mobile network in one example compiles a billing record of the non-toll-free call for the owner of the mobile phone. A control component of a communication network of the calling communication device in one example compiles a billing record of the non-toll-free call for the owner of the calling communication device. For example, the owner of the calling communication device is responsible for a bill based on the call to the mobile phone.

As one shortcoming of these network arrangements, toll-free numbers cannot be associated with mobile phones. For example, if the called communication device comprises a mobile phone, then the control component cannot connect the user of the mobile phone with the user of the calling communication device in a toll-free call to the mobile phone. As another shortcoming, the control component is unable to compile a billing record of the toll-free call for an owner of the mobile phone.

Thus, a need exists for a control capability that connects a toll-free call with a mobile phone associated with a toll-free number.

SUMMARY

The invention in one implementation encompasses an apparatus. The apparatus comprises one or more control components that connect with one or more mobile phones one or more toll-free calls placed by one or more users of one or more communication devices to one or more toll-free numbers associated with the one or more mobile phones.

Another implementation of the invention encompasses a method. One or more service control point components are bypassed with one or more toll-free calls from the one or more communication devices to one or more toll-free numbers. The one or more toll-free calls are connected with one or more mobile phones associated with the one or more toll-free numbers.

Yet another implementation of the invention encompasses an article. The article comprises one or more computer-readable signal-bearing media. The article comprises means in the one or more media for bypassing one or more service control point components with one or more toll-free calls from the one or more communication devices to one or more toll-free numbers. The article comprises means in the one or more media for connecting the one or more toll-free calls with one or more mobile phones associated with the one or more toll-free numbers.

DESCRIPTION OF THE DRAWINGS

Features of exemplary implementations of the invention will become apparent from the description, the claims, and the accompanying drawings in which:

DETAILED DESCRIPTION

Figure 1:
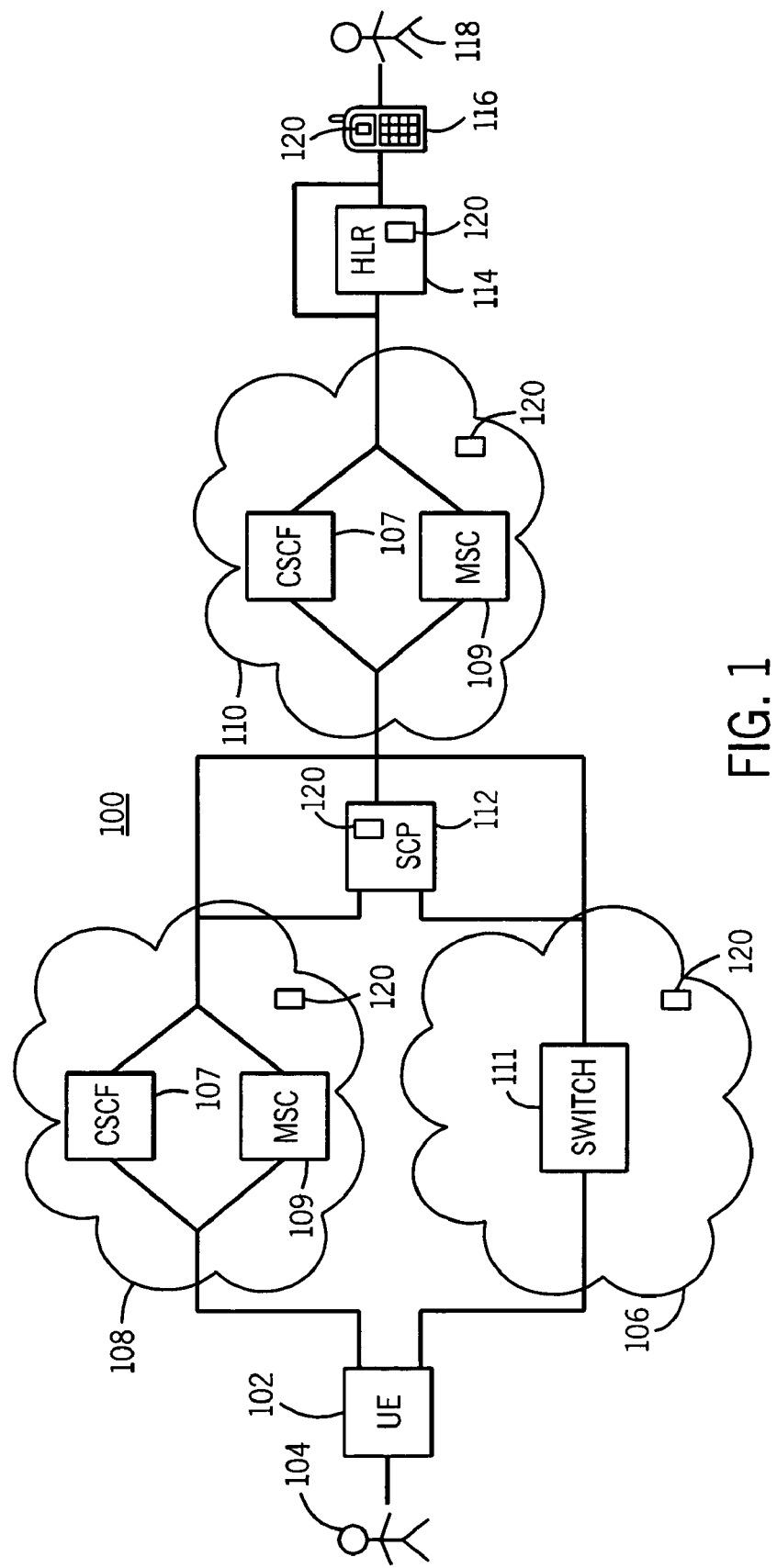
FIG. 1 is a representation of an exemplary implementation of an apparatus that comprises one or more communication devices, one or more control components, one or more service control point components, one or more home location register components, and one or more mobile phones.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more communication devices 102, one or more network components 106, 108, and 110, one or more control components, for example, one or more call state control function ("CSCF") components 107 and one or more mobile switching center ("MSC") components 109, one or more service control point ("SCP") components 112, one or more home location register ("HLR") components 114, and one or more mobile phones 116. The mobile phone 116 in one example is associated with a toll-free number. For example, the home location register component 114 in one example stores a list of one or more mobile phones associated with one or more toll-free numbers. A user 104 in one example employs the communication device 102 to place a toll-free call to the toll-free number. The network component 106 or the network component 108 receives the toll-free call. Then, the network component 106 or the network component 108 in one example passes the toll-free call to the network component 110 to bypass the service control point component 112. The network component 110 connects the user 104 of the communication device 102 with a user 118 of the mobile phone 116 in the toll-free call.

The user 104 may employ the communication device 102 to communicate in a standard telephone call or a toll-free call. In one example, the user 104 dials a standard telephone number with the communication device 102. For example, the standard telephone number comprises an area code and a seven digit local code. In another example, the user 104 dials a toll-free number with the communication device 102. For example, the toll-free number comprises an 800 number or an 866 number. The toll-free number in one example is associated with the mobile phone 116. The communication device 102 in one example comprises an instance of the recordable data storage medium 120. In one example, the communication device 102 comprises one or more of a landline telephonic device, a mobile phone, a personal digital assistant, and a computer. For example, the communication device 102 comprises user equipment ("UE").

Where the communication device 102 comprises a landline telephonic device, the user 104 in one example dials the toll-free number with the communication device 102 to send the toll-free call to the network component 106. The network component 106 in one example comprises an instance of the recordable data storage medium 120. In one example, the network component 106 in one example comprises a public switched telephone network ("PSTN"). The network component 106 comprises a switch component 111.

Upon receipt of the toll-free call at the network component 106, the switch component 111 in one example queries the service control point component 112 with the toll-free number of the toll-free call for connection to the mobile phone 116. The service control point component 112 in one example comprises an instance of the recordable data storage medium 120. The switch component 111 analyzes the toll-free number of the toll-free call to make a determination of association of the toll-free number with the mobile phone 116 or a landline telephonic device. For example, the switch component 111 compares the toll-free number to one or more phone numbers in a database of the network component 106 to make the determination of the association of the mobile phone 116 or the landline telephonic device.

In one example, where the toll-free number is associated with the mobile phone 116, the switch component 111 bypasses the service control point component 112 to route the toll-free call to the network component 110. For example, where the mobile phone 116 is associated with the toll-free number and a standard telephone number, the network component 106 bypasses the service control point component 112 because the service control point component 112 is unable to translate the toll-free number of the mobile phone 116 into the standard telephone number of the mobile phone 116. In another example, where the toll-free number is associated with the landline telephonic device, the switch component 111 queries the service control point component 112 with the toll-free number of the toll-free call. For example, where the landline telephonic device is associated with the toll-free number and a standard telephone number, the service control point component 112 employs the toll-free number to make a determination of the standard telephone number of the landline telephonic device.

Where the toll-free number is associated with a landline telephonic device, the switch component 111 sends the toll-free call to a public telephone network, for example the public switched telephone network. The public switched telephone network in one example employs the standard telephone number to initiate a billing record of the toll-free call for the landline telephonic device. For example, the user of the landline telephonic device pays for the toll-free call based on the billing record. The public switched telephone network connects the communication device 102 with the landline telephonic device in the toll-free call through employment of the standard telephone number.

Where the communication device 102 comprises a mobile device, the user 104 in one example dials the toll-free number with the communication device 102 to send the toll-free call to the network component 108. The network component 108 in one example comprises an instance of the recordable data storage medium 120. The network component 108 in one example comprises a public land mobile network ("PLMN"). The public land mobile network in one example comprises one or more of a call state control function component 107 and a mobile switching center 109.

Upon receipt of the toll-free call at the network component 108, one or more of the call state control function component 107 and the mobile switching center 109 in one example pass the toll-free call to one or more of the network component 110. The call state control function component 107 and/or the mobile switching center 109 analyze the toll-free number of the toll-free call to make a determination of association of the toll-free number with the mobile phone 116. For example, the call state control function component 107 and/or the mobile switching center 109 compare the toll-free number to one or more phone numbers in a database of the network component 108 to make the determination of the association of the toll-free number with the mobile phone 116.

In one example, where the toll-free number is associated with the mobile phone 116, the one or more of the call state control function component 107 and the mobile switching center 109 bypass the service control point component 112 to route the toll-free call to the network component 110. For example, the call state control function component 107 and/or the mobile switching center 109 bypass the service control point component 112 because the service control point component 112 is unable to translate the toll-free number of the mobile phone 116 into the standard telephone number of the mobile phone 116. In another example, where the toll-free number is associated with a landline telephonic device, the call state control function component 107 and/or the mobile switching center 109 query the service control point component 112 with the toll-free number of the toll-free call. For example, the service control point component 112 employs the toll-free number to make a determination of the standard telephone number of the landline telephonic device.

Where the toll-free number is associated with the mobile phone 116, the network component 110 in one example connects the user 104 of the communication device 102 with the user 118 of the mobile phone 116 in the toll-free call. The network component 110 in one example comprises an instance of the recordable data storage medium 120. The network component 110 in one example comprises a private communications network. For example, a wireless carrier company owns the network component 110.

Upon receipt of the toll-free call at the network component 110, one or more of the call state control function component 107 and the mobile switching center 109 of the network component 110 query the home location register component 114 for a location of the mobile phone 116. The mobile phone 116 in one example is associated with one or more of the toll-free number and the standard telephone number. The standard telephone number in one example comprises an E.164 directory number ("DN"). The call state control function component 107 and/or the mobile switching center 109 of the network component 110 in one example analyze the toll-free number of the toll-free call to make a determination of the standard telephone number associated with the mobile phone 116. For example, the one or more of the call state control function component 107 and the mobile switching center 109 of the network component 110 compare the toll-free number to one or more phone numbers in a database of the network component 110 to make the determination of the standard telephone number of the mobile phone 116.

The one or more of the call state control function component 107 and the mobile switching center 109 of the network component 110 pass the one or more of the toll-free number and the standard telephone number to the home location register component 114. The home location register component 114 in one example comprises an instance of the recordable data storage medium 120. The home location register component 114 makes a determination of the location of the mobile phone 116. In one example, the network component 110 searches the home location register component 114 for an entry associated with the toll-free number to make the determination of the location of the mobile phone 116. In another example, the network component 110 searches the home location register component 114 for an entry associated with the standard telephone number to make the determination of the location of the mobile phone 116.

The network component 110 connects the user 104 of the communication device 102 with the user 118 of the mobile phone 116 in the toll-free call at the location of the mobile phone 116. The mobile phone 116 in one example comprises an instance of the recordable data storage medium 120. The network component 110 in one example sends an indicator of the toll-free number to the mobile phone 116 to indicate to the user 118 that an incoming telephone call was placed through employment of the toll-free number. The indicator in one example comprises one or more of a dialed number display, an icon, a tone, and a light (not shown), as will be understood by those skilled in the art.

The network component 110 in one example compiles a billing record of the toll-free call. The billing record in one example comprises one or more of a call length, a call start time, a call end time, a calling party number, and a call charge. One or more of the network components 106 and 108 in one example compiles a billing record for the user 104 of the communication device 102, but the user 104 does not pay for the toll-free call. For example, the call charge is zero dollars for the user 104. The user 118 of the mobile phone 116 in one example comprises an owner of the mobile phone 116. For example, the owner of the mobile phone 116 is responsible for a bill based on the billing record.

In one example, where the mobile phone 116 is associated only with the toll-free number, the network component 110 compiles the billing records of the toll-free calls for the user 118 of the mobile phone 116. In another example, where the mobile phone 116 is associated with the toll-free number and the standard telephone number, the network component 110 adds the billing record of the toll free call to one or more billing records of the standard telephone number. For example, the network component 110 consolidates the billing records of the toll-free calls with the billing records of the standard telephone calls into one or more consolidated billing records for the user 118 of the mobile phone 116. In yet another example, one or more external billing center adds the billing record of the toll free call to the one or more billing records of the standard telephone number into the one or more consolidated billing records. The network component 110 in one example passes the billing records and the consolidated billing records to the one or more external billing centers to compile the bills based on the billing records and the consolidated billing records.

Figure 2:
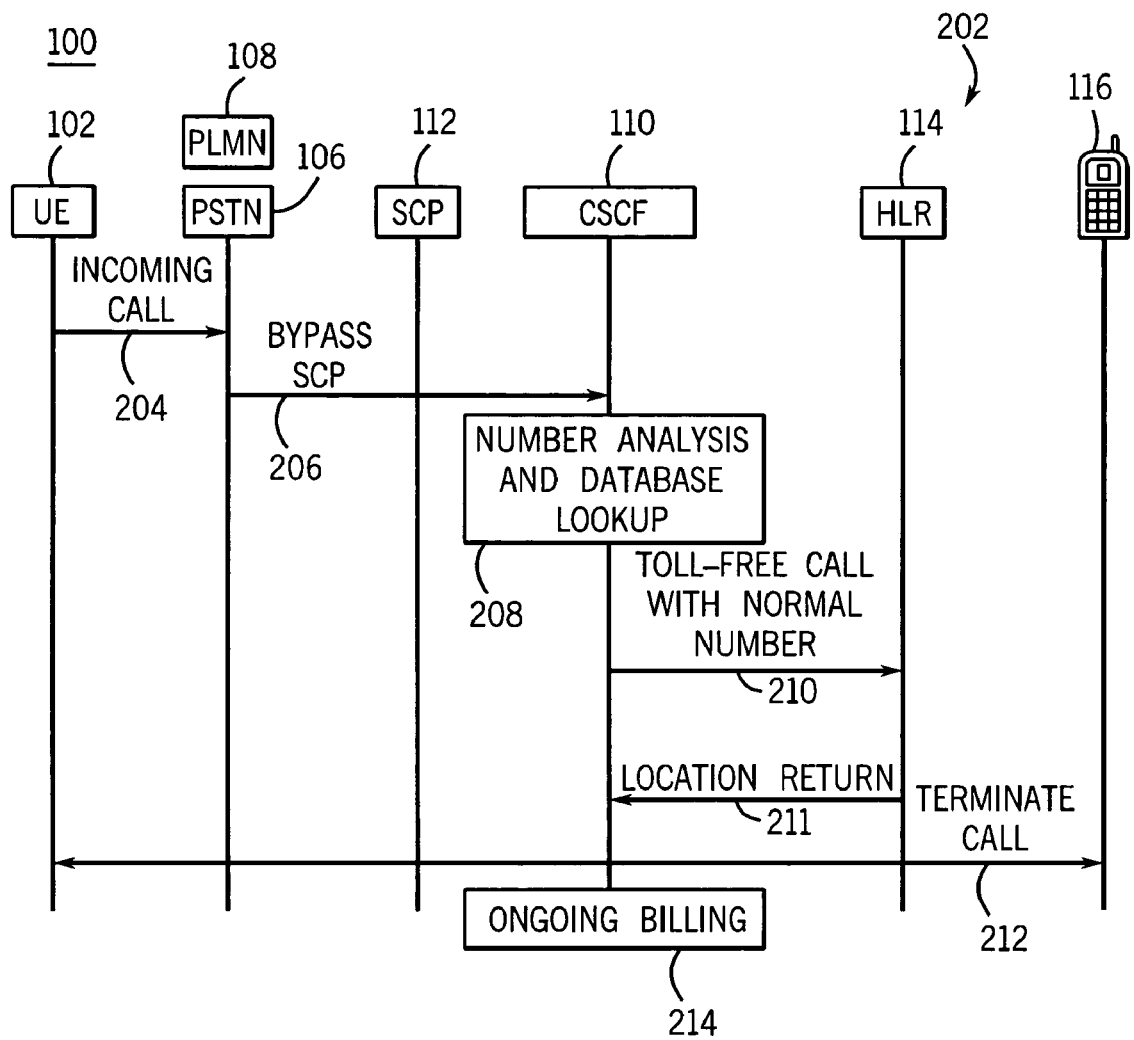
FIG. 2 is a representation of an exemplary connection of a toll-free call to a mobile phone associated with a toll-free number and a standard telephone number by the control components of the apparatus of FIG. 1.

Referring to FIGS. 1 and 2, an illustrative description of exemplary operation of the apparatus 100 is presented, for explanatory purposes. Message flow 202 represents an exemplary connection of a toll-free call to the mobile phone 116 by the network components 106, 108, and 110. In the message flow 202, the mobile phone 116 is associated with a toll-free number and a standard telephone number. The network component 106 or 108 connects a call placed by the communication device 102 to the network component 110. For example, the network component 106 or 108 bypasses the service control point component 112. The network component 110 employs the home location register component 114 to make a determination of a location of the mobile phone 116. The network component 110 connects the user 104 of the communication device 102 with the user 118 of the mobile phone 116 in the toll-free call.

The user 104 employs the communication device 102 to place a toll-free call 204 to a toll-free number associated with the mobile phone 116. The communication device 102 passes the toll-free call 204 to the network component 106 or 108. "INCOMING CALL" in one example serves to represent the toll-free call 204. Upon receipt of the toll-free call 204, the network component 106 or 108 in one example makes a comparison of the toll-free number to one or more numbers in an internal database of the network component 106 or 108. The network component 106 or 108 makes a determination of the association of the toll-free number with the mobile phone 116. Then, the network component 106 or 108 sends the toll-free call 204 in a bypass message 206 to the network component 110 to bypass the service control point component 112. "BYPASS SCP" in one example serves to represent the bypass message 206. If the network component 106 or 108 makes the determination that the toll-free number is associated with the mobile phone 116, then the network component 106 or the network component 108 bypasses the service control point component 112 to pass the toll-free call 204 in the bypass message 206 to the network component 110.

Upon receipt of the toll-free call 204 at the network component 110, the network component 110 searches an internal database of the network component 110 with the toll-free number to make a determination of a standard telephone number 208 associated with the mobile phone 116. "NUMBER ANALYSIS AND DATABASE LOOKUP" in one example serves to represent the determination of the standard telephone number 208. Upon the determination of the standard telephone number 208, the network component 110 passes the standard telephone number 208 in a location determination message 210 to the home location register component 114. The home location register component 114 makes a determination of a location of the mobile phone 116. "TOLL-FREE CALL WITH NORMAL NUMBER" in one example serves to represent the location determination message 210. For example, the network component 110 searches the home location register component 114 to make the determination of the location.

Upon the determination of the location, the home location register component 114 sends a location return message 211 to the network component 110. "LOCATION RETURN" in one example serves to represent the location return message 211. Upon receipt of the location return message 211, the network component 110 employs location information of the mobile phone 116 from the location return message 211 to create a connection 212 between the communication device 102 and the mobile phone 116. The network component 110 employs the connection 212 for delivery of the toll-free call 204. "TERMINATE CALL" in one example serves to represent the connection 212 between the communication device 102 and the mobile phone 116. For example, the connection 212 enables the user 104 of the communication device 102 to communicate with the user 118 of the mobile phone 116 in the toll-free call 204.

The network component 110 in one example compiles a billing record 214 of the toll-free call 204. For example, the user 118 of the mobile phone 116 pays a bill based on the billing record 214. "ONGOING BILLING" in one example serves to represent the billing record 214. The network component 110 in one example adds the billing record 214 of the toll-free call 204 (e.g. to the toll free number) to one or more billing records of one or more standard telephone calls (e.g. to the standard telephone number) of the mobile phone 116. For example, the network component 110 consolidates the billing record 214 of the toll-free call 204 with the billing records of the standard telephone calls for the user 118 of the mobile phone 116.

Figure 3:
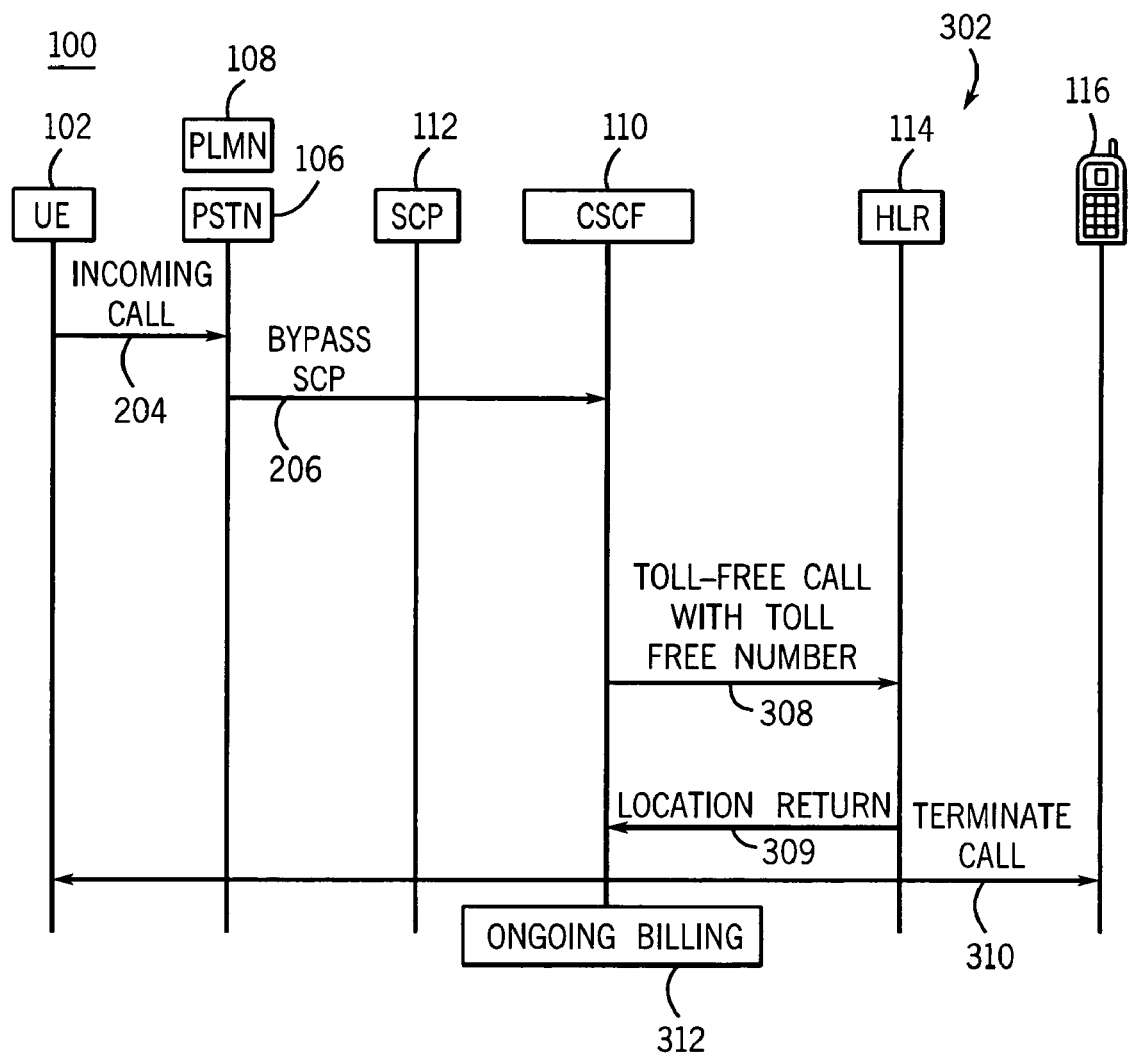
FIG. 3 is a representation of an exemplary connection of a toll-free call to a mobile phone associated with a toll-free number by the control components of the apparatus of FIG. 1.

Referring to FIGS. 1 and 3, an illustrative description of exemplary operation of the apparatus 100 is presented, for explanatory purposes. Message flow 302 represents an exemplary connection of a toll-free call to the mobile phone 116 by the network components 106, 108, and 110. In the message flow 302, the mobile phone 116 is associated with a toll-free number only. The communication device 104 passes the toll-free call 204 at the toll-free number of the mobile phone 116 to the network component 106 or 108. Upon receipt of the toll-free call 204, the network components 106 or 108 bypasses the service control point component 112 to send the toll-free call 204 to the network component 110 as described in message flow 202.

The network component 110 passes the toll-free call 204 with the toll-free number in a location determination message 308 to the home location register component 114. "TOLL-FREE CALL WITH NORMAL NUMBER" in one example serves to represent the location determination message 308. For example, the network component 110 searches the home location register component 114 to make the determination of the location. Upon the determination of the location, the home location register component 114 sends a location return message 309 to the network component 110. "LOCATION RETURN" in one example serves to represent the location return message 309.

Upon receipt of the location return message 309, the network component 110 employs location information of the mobile phone 116 from the location return message 309 to create a connection 310 between the communication device 102 and the mobile phone 116. The network component 110 employs the connection 310 for delivery of the toll-free call 204. "TERMINATE CALL" in one example serves to represent the connection 310 between the communication device 102 and the mobile phone 116. For example, the connection 310 enables the user 104 of the communication device 102 to communicate with the user 118 of the mobile phone 116 in the toll-free call 204. The network component 110 in one example compiles a billing record 312 of the toll-free call 204. For example, the user 118 of the mobile phone 116 pays a bill based on the billing record 214. "ONGOING BILLING" in one example serves to represent the billing record 214.

The apparatus 100 in one example employs one or more computer-readable signal-bearing media. Examples of a computer-readable signal-bearing medium for the apparatus 100 comprise the recordable data storage medium 120 of the network components 106, 108, and 110, the service control point component 112, the home location register component 114, and the mobile phone 116. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
one or more control components that connect with one or more mobile phones one or more toll-free calls placed by one or more users of one or more communication devices to one or more toll-free numbers associated with the one or more mobile phones;
wherein the one or more control components route the one or more toll-free calls to the one or more mobile phones;
wherein the one or more control components comprise a first control component and a second control component, wherein the one or more toll-free calls placed by the one or more users of the one or more communication devices to the one or more toll-free numbers associated with the one or more mobile phones comprise a toll-free call placed by a user of a communication device to a toll-free number associated with a mobile phone;
wherein the mobile phone is associated with the toll-free number and a standard telephone number;
wherein the second control component adds a billing record for the toll-free call to one or more billing records associated with the standard telephone number;
wherein the second control component consolidates the billing record of the toll-free call with the one or more billing records associated with the standard telephone number for an owner of the mobile phone.

2. The apparatus of claim 1,
wherein the first control component compares the toll-free number to one or more telephone numbers stored in a database component;
wherein if the toll-free number matches one or more of the one or more telephone numbers located in the database, then the first control component passes the toll-free call through the second control component to bypass a service control point component responsible for translating one or more other toll-free numbers of one or more other toll-free calls that are unassociated with the one or more mobile phones into one or more standard telephone numbers.

3. The apparatus of claim 2, wherein the communication device comprises a telephonic device;

wherein the first control component comprises a mobile switching center or a call state control function of a public switched telephone network;

wherein upon placement of the toll-free call by the user of the telephonic device to the toll-free number, the mobile switching center or the call state control function of the switched telephone network passes the toll-free call Through the second control component to bypass the service control point component.

4. The apparatus of claim 2, wherein the mobile phone comprises a first mobile phone, wherein the communication device comprises a second mobile phone;

wherein the first control component comprises a mobile switching center or a call state control function of a public land mobile network;

wherein upon placement of the toll-free call by the user of the second mobile phone to the toll-free number of the first mobile phone, the mobile switching center or the call state control function of the first land mobile network passes the toll-free call through the second control component to bypass the service control point component.

5. The apparatus of claim 1, wherein the first control component passes the toll-free call placed by the user of the communication device to the second control component, wherein the second control component routes the toll-free call to the mobile phone associated with the toll-free number.

6. The apparatus of claim 5, wherein the second control component searches a home location register component for an entry associated with the toll-free number to make a determination of a location of the mobile phone;

wherein the second control component connects the toll-free call to the mobile phone at the location.

7. The apparatus of claim 5, wherein the second control component employs the toll-free number to make a determination of the standard telephone number associated with the mobile phone, wherein the second control component employs the standard telephone number to make a determination of a. location of the mobile phone.

8. The apparatus of claim 7, wherein the second control component searches a home location register component for an entry associated with the standard phone number to make the determination of the location of the mobile phone;

wherein the second control component connects the toll-free call to the mobile phone at the location.

9. The apparatus of claim 1, wherein the control component sends an indicator of the toll-free call placed by the user of the communication devices to the toll-free number to the mobile phone;

wherein a user of the mobile phone employs the indicator to distinguish the toll-free call from a standard telephone call.

10. The apparatus of claim 1, wherein the one or more control components compile billing information of the one or more toll-free calls, wherein one or more owners of the one or more mobile phones are responsible for one or mote bills based on the billing information;

wherein the one or more users of the one or more communication devices are free from responsibility for the one or more bills.

11. The apparatus of claim 1, wherein the one or more mobile phones are associated with only the one or more toll-free numbers.

12. The apparatus of claim 1, wherein the second control component passes the billing record for the toll-free call to one or more external billing centers to compile one or more consolidated bills based on the toll-free call.

13. A method, comprising the steps of:

bypassing one or more service control point components with one or more toll-free calls from one or more communication devices to one or more toll-free numbers; and connecting the one or more toll-free calls to one or more mobile phones associated with the one or more toll-free numbers;

wherein the one or more toll-free calls from the one or more communication devices to the one or more toll-free numbers comprise a toll-free call from a communication device to a toll-free number, wherein the one or more mobile phones comprise a mobile phone, wherein the one or more service control point components comprise a service control point component, wherein the mobile phone is associated with the toll-free number and a standard telephone number;

the method further comprising the steps of:

compiling a billing record for the toll-free call associated with the toll-free number; and combining the billing record for the toll-free call with one or more billing records for one or more standard telephone calls associated with the standard telephone number.

14. wherein the step of bypassing the service control point with the toll-free call from the communication device to the toll-free number comprises the steps of:

receiving the toll-free call to the toll-free number from the communication device;

matching the toll-free number with a telephone number of one or more telephone numbers stored in a database component; and passing the toll-free call to the mobile phone.

15. The method of claim 14, wherein the step of passing the toll-free call to the mobile phone comprises the steps of:

searching a home location register component for an entry associated with the toll-free number to make a determination of a location of the mobile phone; and connecting the toll-free call to the mobile phone at the location.

16. The method of claim 14, wherein the step of passing the toll-free call to the mobile phone comprises the steps of:

making a determination of the standard telephone number associated with the mobile phone through employment of the toll-free number; and connecting the toll-free call to the mobile phone through employment of the standard telephone number or the toll-free number.

17. The method of claim 16, wherein the step of connecting the communication device to the mobile phone through employment of the standard telephone number or the toll-free number comprises the steps of:

searching a home location register component with the standard telephone number or the toll-free number to make a determination of a location of the mobile phone; and connecting the toll-free call to the mobile phone at the location.

18. The method of claim 13, wherein the one or more mobile phones associated with the one or more toll-free numbers comprise a mobile phone associated with a toll-free number, wherein the one or more toll-free calls from the one or more communication devices comprise a toll-free call from a communication device, the method further comprising the steps of:

sending an indicator to the mobile phone; and indicating with the indicator that the toll-free call originated from employment of the toll-free number by a user of the communication device.

19. The method of claim 13, wherein the one or more mobile phones associated with the one or more toll-free numbers comprise a mobile phone associated with a toll-free number, wherein the one or more toll-free calls from the one or more communication devices comprise a toll-free call from a communication device, wherein the step of connecting the toll-free call to the mobile phone associated with the toll-free number comprises the steps of:

connecting the communication device to the mobile phone in the toll-free call;

preventing a charge to an owner of the communication device for the toll-free call; and charging an owner of the mobile phone for the toll-free call.

* * * * *